United States Patent [19]

Matsui et al.

[11] Patent Number: 5,579,068
[45] Date of Patent: Nov. 26, 1996

[54] ELECTRONIC FLASH APPARATUS OF A CAMERA

[75] Inventors: Hideki Matsui, Fujisawa; Nobuyoshi Hagiuda; Ryotaro Takayanagi, both of Yokohama; Hiroshi Sakamoto, Kawasaki, all of Japan

[73] Assignee: Nikon Corporation, Tokyo, Japan

[21] Appl. No.: 524,425

[22] Filed: Sep. 6, 1995

Related U.S. Application Data

[63] Continuation of Ser. No. 268,737, Jun. 30, 1994, abandoned, which is a continuation of Ser. No. 84,140, Jul. 1, 1993, abandoned.

[30] Foreign Application Priority Data

Jul. 6, 1992 [JP] Japan ............................ 4-046924 U
Jul. 6, 1992 [JP] Japan ............................ 4-046925 U

[51] Int. Cl.$^6$ ................................................ G03B 15/05
[52] U.S. Cl. ........................ 396/173; 396/180; 396/203
[58] Field of Search ........................ 354/127.11, 127.12, 354/418; 315/130–133, 241 P

[56] References Cited

U.S. PATENT DOCUMENTS 4,799,078  1/1989  Hayama .................... 354/127.12 X Primary Examiner—W. B. Perkey
Attorney, Agent, or Firm—Shapiro and Shapiro

[57] ABSTRACT

Disclosed is an electronic flash apparatus of a camera incorporating a focal plane shutter. The apparatus is constructed of a capacitor for storing an electric charge, a flashtube for irradiating a subject with a flash of light by the electric charge stored in the capacitor and a setting unit capable of setting any of a signal flash mode in which the flashtube effects a single flash and a high-speed mode in which the flashtube effects high-speed repetitive flash. The apparatus is further constructed of a voltage setting unit for setting a first voltage as an energizing voltage when the single flash mode is set and setting a second voltage higher than the first voltage as an energizing voltage when the high-speed mode is set and an energizing unit for monitoring a voltage when the capacitor stores the electric charge and energizing a ready light just when the voltage in the storage of the electric charge exceeds the set energizing voltage.

8 Claims, 5 Drawing Sheets

ELECTRONIC FLASH APPARATUS OF A CAMERA

This is a continuation of application Ser. No. 08/268,737 filed Jun. 30, 1994, which is a continuation of application Ser. No. 08/084,140 filed Jul. 1, 1993, both now abandoned.

BACKGROUND OF THE INVENTION

1. Field of the Invention

The present invention relates generally to an electronic flash apparatus of a camera and, more particularly, to a camera electronic flash apparatus so employed as to be mounted in a camera incorporating a focal plane shutter.

2. Related Background Art

Typically, a ready light is installed in an electronic flash apparatus so employed as to be mounted in a camera incorporating a focal plane shutter. The ready light for indicating a charge level of a main capacitor for storing a flash energy is installed to indicate a state where the electronic flash apparatus can flash.

This ready light is generally adjusted to be energized at an energizing voltage with an underexposure of approximately 1 [EV] as compared with the flash when the main capacitor is full of electric charge.

Hence, if a flashtube is fired immediately after energizing the ready light, a photo shot with a full-open exposure of the focal plane shutter is subjected to the underexposure of about 1 [EV] on the entire picture at the worst case.

In this case, an aperture of the photographing lens is opened by one f-number when taking the photo, thus making it possible to provide the photo taken with a proper exposure.

Contrastingly, in the case of photography at a higher shutter speed, the shutter provides not the full-open exposure but a slit exposure. The whole film surface can not be exposed by a single flash. A practice is therefore that the entire film surface is exposed by continuing a high-speed repetitive flash (FP flash) during the slit exposure of the slit surface.

There arise, however, the following problems inherent in the conventional electronic flash apparatus. The underexposure tends to be caused in the whole photographed picture by the flash immediately after or before energizing the ready light in the single flash. Contrastingly, as illustrated in FIG. 5, an intensive underexposure indicated by oblique lines is produced in only one portion on the photographed picture by the flash immediately after or before energizing the ready light in the high-speed repetitive flash. This results in a photo containing a vignetted portion K.

More specifically, the high-speed repetitive flash is intended to expose the film surface with the light. This exposure involves a generation of approximately uniform light in by repeating the flash of a short duration at a high speed and irradiating a slit formed between a shutter leading curtain C and a shutter trailing curtain D with the light. Besides, a flash quantity for each operation is predetermined in the high-speed repetitive flash. Therefore, before a voltage of the main capacitor comes to a predetermined voltage, i.e., when effecting the high-speed repetitive flash in a state where the voltage of the main capacitor is insufficient, as shown in FIG. 4, the flash is terminated at a timing $t_6$. The photo turns out as shown in FIG. 5.

Note that the flash quantity per operation may be set somewhat small for preventing this state. The high-speed repetitive flash is, however, very small in the flash guide number in terms of characteristics thereof. Taking account of a condition in use, it is therefore desirable to the user that the flash quantity is set to, even if small, increment the flash guide number.

Further, so-called stroboscopic photography based on a combination of the camera and the electronic flash apparatus is conducted with a single flash to singly fire the flashtube.

To be more specific, as illustrated in FIG. 8, the flashtube is singly fired during a time period (between $t_2$–$t_4$) for which the shutter leading and trailing curtains C, D of the focal plane shutter are fully opened on a film surface F. The film surface F is thereby exposed with a flash waveform G as shown in FIG. 8.

Then, in the case of this single flash, a flash starting timing of the flashtube is a timing $t_2$ shown in FIG. 8, viz., a timing when the tripping of the shutter leading curtain C on the film surface F is ended.

In the stroboscopic photography based on the single flash described above, however, the shutter curtains have to be invariably fully opened. This naturally involves a limit in terms of shutter flashsync time of second in the stroboscopic photography.

On the other hand, there have recently been developed a so-called high-speed repetitive flash wherein the flashtube is fired repeatedly at a high speed as depicted in FIG. 7, and the flash with a flash waveform H is thereby made consecutive for a duration well longer than in the single flash. The stroboscopic photography based on this high-speed repetitive flash is adopted for a slit flashsync at a higher shutter speed.

An output timing when this high-speed repetitive flash is started is a timing $t_2$ shown in FIG. 7, i.e., a timing when starting an exposure of the film surface F (a traverse point over A in FIG. 7) after the shutter leading curtain C has been tripped.

Then, the film surface F is, as illustrated in FIG. 9, exposed slitwise sequentially from a side A to a side B at the slit flashsync for a duration of this high-speed repetitive flash.

Generally, however, there is some delay with respect to the start of flashing of the flashtube till a flash intensity of the flashtube becomes substantially uniform in the high-speed repetitive flash. This leads to a problem of producing a so-called vignetted portion K where a start edge of an exposure frame on the film surface F is, as indicated by oblique lines in FIG. 10, not exposed at the slit flashsync due to this delay.

Then, this vignetted portion K becomes larger with a higher shutter speed of second which involves a narrower shutter slit width.

SUMMARY OF THE INVENTION

It is a primary object of the present invention to provide an electronic flash apparatus of a camera that is capable of certainly performing a single flash and a high-speed repetitive flash during energizing of a ready light.

It is another object of the present invention to provide a camera system capable of surely obviating a possibility in which a start edge of an exposure frame on a film surface may not be exposed at a slit flashsync for a duration of the high-speed repetitive flash.

To accomplish the objects given above, according to one aspect of the invention, there is provided a camera electronic flash apparatus, the arrangement being such that the electronic flash apparatus is connected to the camera incorporating focal plane shutter, a flashtube irradiates a subject with a flash of light by an electric charge stored in a capacitor, and a ready light is energized when a voltage of the capacitor reaches a predetermined energizing voltage. The electronic flash apparatus includes a setting means (e.g., a mode setting circuit) for setting the flash of the flashtube in any one of a single flash mode and a high-speed repetitive flash mode. The electronic flash apparatus also includes an energizing means (e.g., a main control circuit) for energizing the ready light with a predetermined first energizing voltage when the single flash mode is set by this setting means and energizing the ready light with a second energizing voltage higher than the predetermined first energizing voltage when the high-speed repetitive flash mode is set.

In the electronic flash apparatus of the camera according to this invention, the ready light is energized with the predetermined first energizing voltage when the single flash mode is set by the setting means.

While on the other hand, the high-speed repetitive flash mode is set by the setting means, the ready light is energized with the second energizing voltage higher than the predetermined first energizing voltage.

According to another aspect of the invention, there is provided a camera system having an electronic flash apparatus arranged such that the electronic flash apparatus is connected to a camera incorporating a focal plane shutter, and a flashtube irradiates a subject with a flash of light by an electric charge stored in a capacitor and effects a high-speed repetitive flash at such a slit flashsync that the focal plane shutter is not fully opened. The camera system includes a signal outputting means (e.g., a leading curtain trip detection switch in FIG. 1) for outputting a flash starting signal earlier by a predetermined time than when a slit aperture of the focal plane shutter reaches a photographing picture of a film at the slit flashsync. The camera system also includes a control means (e.g., a main control circuit in FIG. 1) for starting the high-speed repetitive flash of the flashtube upon inputting the flash starting signal.

In the camera system of this invention, the flashtube starts the high-speed repetitive flash earlier by the predetermined time than when the slit aperture of the focal plane shutter reaches the photographing picture of the film at the slit flashsync. Consequently, when starting the exposure of the film surface, the flashing by the flashtube becomes substantially uniform.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of the present invention will hereinafter be described with reference to the drawings.

Figure 1:
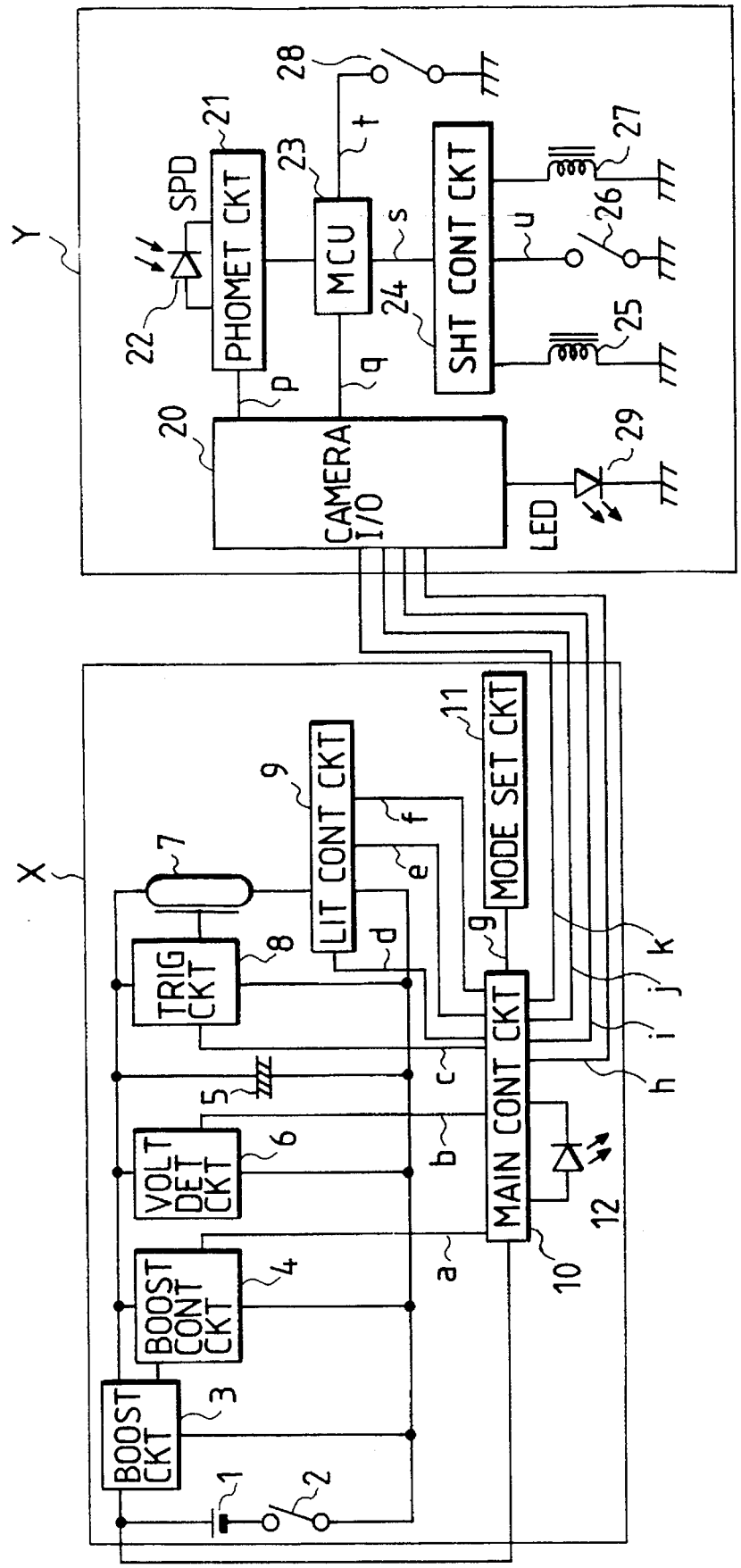
FIG. 1 is a circuit diagram showing one embodiment of an electronic flash apparatus of a camera according to this invention.

FIG. 1 illustrates one embodiment of an electronic flash apparatus of a camera according to this invention. Paying attention to the same Figure, the symbol X designates an electronic flash apparatus, and Y represents a camera.

The electronic flash apparatus X includes a power supply 1 such as a battery, a power switch 2 and a known boost circuit for boosting a voltage of the power supply 1. The electronic flash apparatus X further includes a boost control circuit for controlling an operation of the boost circuit 3, a main capacitor 5 for storing a flash energy stepped up by the boost circuit 3 and a voltage detection circuit 6 for detecting a charge voltage of the main capacitor 5.

Further, the numeral 7 denotes a flashtube for irradiating a subject with the light by discharging an electric charge of the main capacitor 5. Designated at 8 is a trigger circuit for applying a trigger voltage for inducing an excitation in advance of firing the flashtube 7. A flash quantity control circuit 9 controls a flash quantity of the flashtube 7.

Moreover, a main control circuit 10 controls a flash sequence of the electronic flash apparatus in this embodiment and has an energizing means. A mode setting circuit 11 is defined as a setting means for setting any one of a single flash mode and a high-speed repetitive flash mode. A ready light 12 is energized just when a charge level of the main capacitor 5 exceeds a predetermined voltage.

Note that the mode setting circuit 11 sets the flash mode by, e.g., manually selecting the single flash or the high-speed repetitive flash.

Further, the symbol a denotes a signal line through which the main control circuit 10 controls the boost control circuit 4. The symbol b denotes a signal line through which charge voltage information of the main capacitor 5 is outputted from the voltage detection circuit 6 to the main control circuit 10. Indicated at c is a signal line through which the main control circuit 10 outputs a signal for actuating the trigger circuit 8.

Further, the symbol d indicates a signal line through which the main control circuit 10 outputs an actuating signal for actuating the flash quantity control circuit 9. The symbol f represents a signal line through which the main control circuit 10 outputs an operation stop signal for stopping the operation of the flash quantity control circuit 9. The symbol f denotes a signal line through which a flash mode signal for determining a flash mode of the flashtube 7 is outputted from the main control circuit 10 to the flash quantity control circuit 9. The symbol G indicates a signal line through which the flash mode set by the mode setting circuit 11 is outputted to the main control circuit 10.

On the other hand, in the camera Y, a camera interface 20 transfers and receives the signals to and from the electronic flash apparatus X. A photometric circuit 21 integrates a quantity of light emitted from the flashtube 7 of the electronic flash apparatus X and reflected at an object. A photodetector 22 receives the reflected light. An MCU 23 controls a release sequence, etc. of the camera Y.

Further, a shutter curtain control circuit 24 controls actions of a shutter leading curtain C and of a shutter trailing curtain D. A leading curtain magnet 25 controls the action of the shutter leading curtain C. A leading curtain trip detection switch 26 detects a timing when the electronic flash apparatus X starts the high-seed repetitive flash. A trailing curtain magnet 27 controls the action of the shutter trailing curtain D. A release switch 28 serves to start the photography of the camera Y. A ready light 29 is energized together with the ready light of the electronic flash apparatus X.

Then, the camera interface 20 is connected via the signal line p to the photometric circuit 21. The camera interface 20 is connected via the signal line q to the MCU 23. The photometric circuit 21 is connected via the signal line r to the MCU 23.

Further, the MCU 23 is connected via the signal line s to the shutter curtain control circuit 24. The MCU 23 is connected via the signal line t to the release switch 28. The shutter curtain control circuit 24 is connected via the signal line u to the leading curtain trip detection switch 26.

Besides, the main control circuit 10 of the electronic flash apparatus X is connected via four signal lines h, i, j, k to the camera interface 20 of the camera Y. A flash starting signal is transmitted from the camera interface 20 via the signal line h to the main control circuit 10. An energizing signal for the ready light 29 is transmitted from the main control circuit 10 via the signal line i to the camera interface 20.

Further, the camera interface 20 transmits a flash stop signal via a signal line j to the main control circuit 10. A reference voltage is transmitted via a signal line k.

Figure 2:
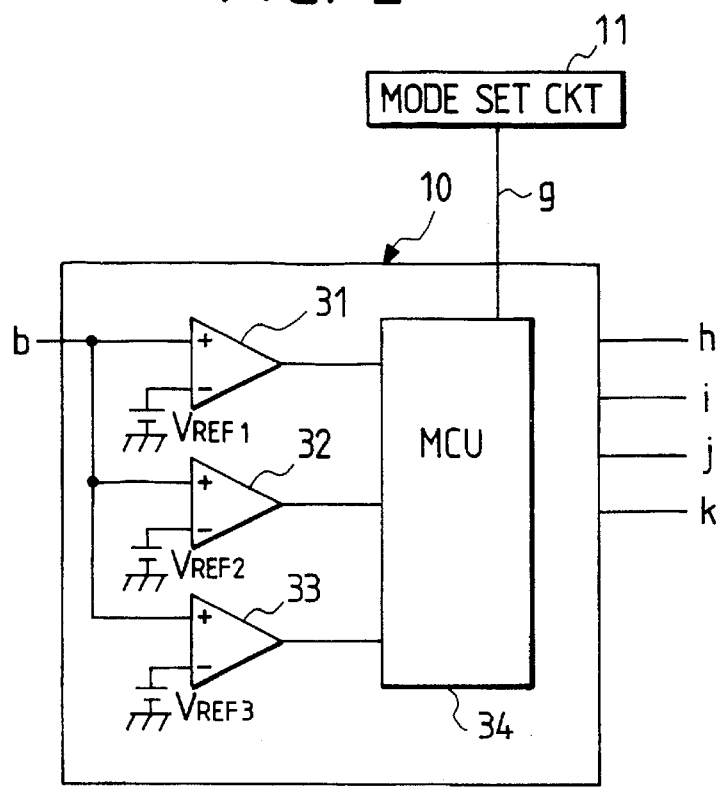
FIG. 2 is a circuit diagram fully illustrating a main control circuit of FIG. 1.

FIG. 2 fully illustrates the main control circuit 10 10 of the electronic flash apparatus X of FIG. 1. In this embodiment, the voltage information of the main capacitor 5 from the voltage detection circuit 6 is inputted via the signal line b to internal comparators 31, 32, 33 of the main control circuit 10.

The comparator 31 detects a predetermined first energizing voltage for the signal flash. The comparator 32 detects a second energizing voltage for the high-speed repetitive flash which is higher than the predetermined first energizing voltage.

The comparator 33 also detects a boost stop voltage.

Note that the symbols $V_{REF1}$, $V_{REF2}$, $V_{REF3}$ represent reference voltages of the detected voltages. An MCU 34 controls the operation of the electronic flash apparatus X on the basis of output information from the comparators 31 to 33 and other information as well.

Figure 3:
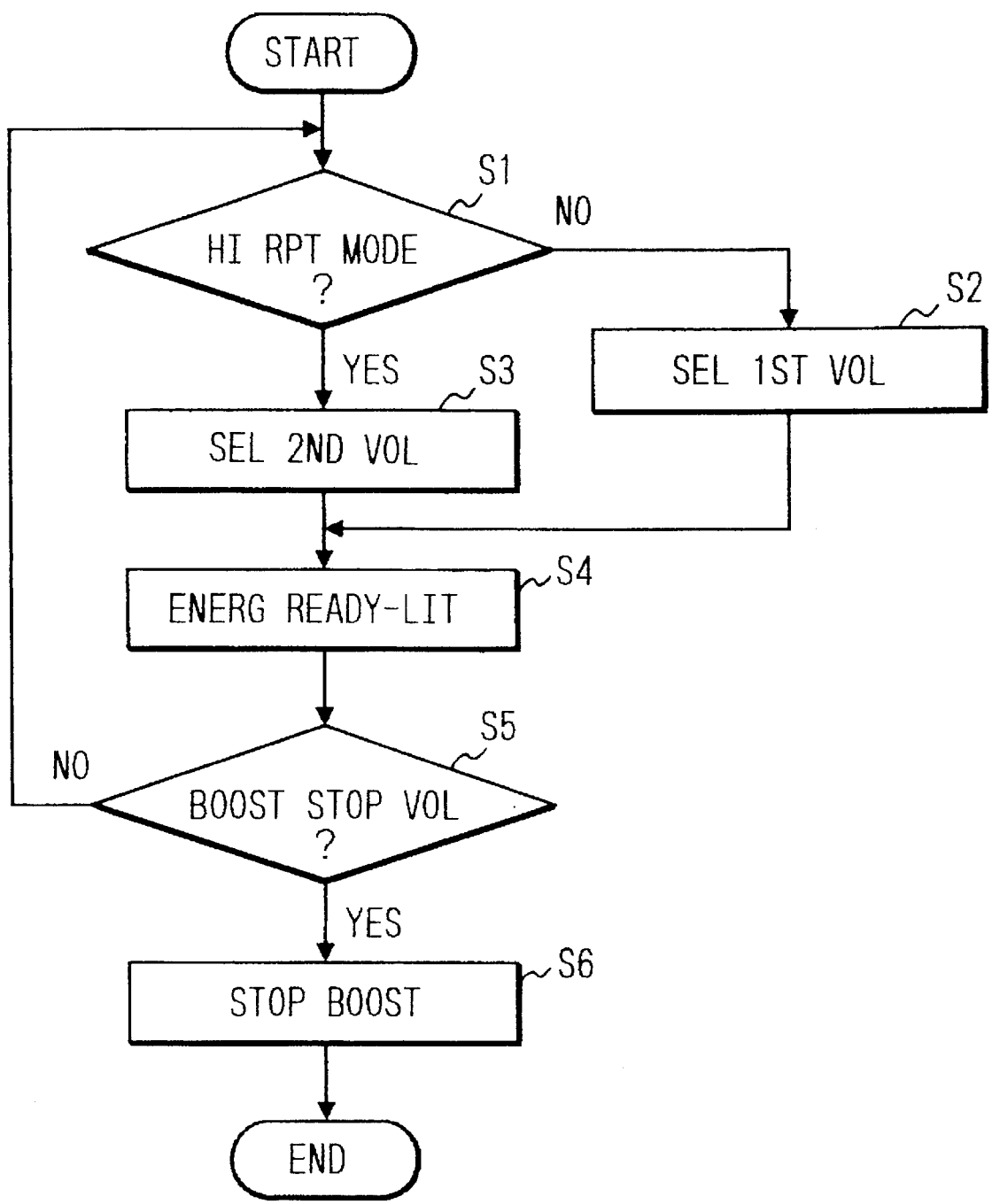
FIG. 3 is a flowchart showing a flow of actions of the main control circuit of FIG. 2.
Figure 5:
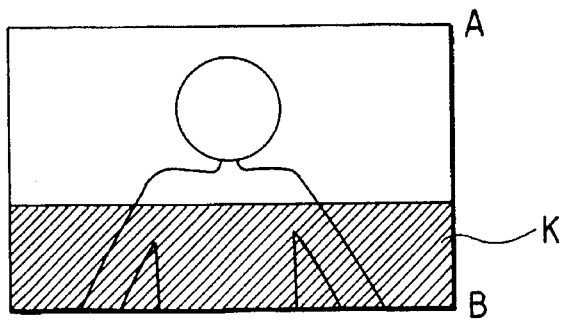
FIG. 5 is a explanatory view showing a vignetted portion for a duration of the high-speed repetitive flash.

This MCU 34, as shown in FIG. 3, judges whether or not the flash mode set by the mode setting circuit 11 is the high-speed repetitive flash mode (step S1). If set in not the high-speed repetitive flash mode but the single flash mode, the first energizing voltage is selected (step S2). The ready light 12 is energized just when the voltage of the comparator 31 becomes the first energizing voltage (step S4).

Whereas if the flash mode set by the mode setting circuit 11 is the high-speed repetitive flash mode, the second energizing voltage (step S3). The ready light 12 is energized Just when the voltage of the comparator 32 comes to the second energizing voltage (step S4).

Judged thereafter is whether the voltage of the comparator 33 reaches the boost stop voltage or not (step S5). When reaching the boost stop voltage, the boosting operation by the boost circuit 3 is stopped (step S6).

Figure 4:
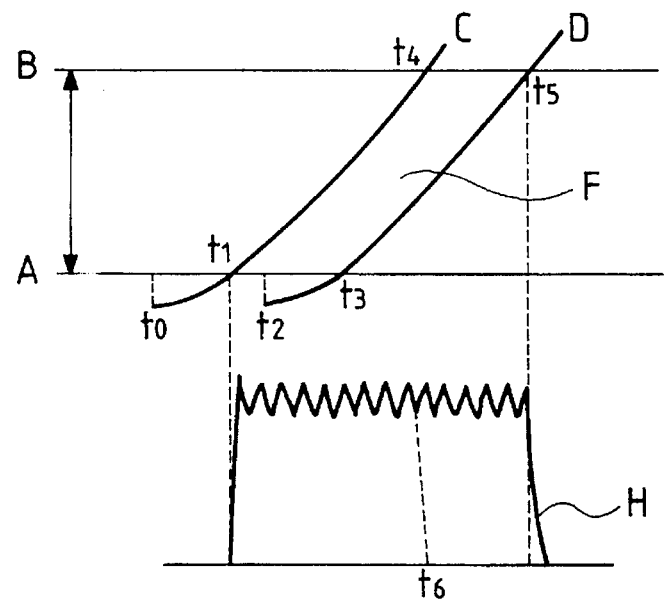
FIG. 4 is an explanatory diagram showing a relationship of a high-speed repetitive flash waveform versus a shutter action at a slit flashsync in the electronic flash apparatus of FIG. 1.

FIG. 4 shows flash timings of the flashtube 7 versus actions of shutter curtains of a focal plane shutter. Referring to FIG. 4, the symbols A, B designate one edge and the other edge of a film surface F. An interval between the one edge A and the other edge B in, e.g., a vertical-trip focal plane shutter is 24 mm.

The symbol C represents a shutter leading curtain, while D is a shutter trailing curtain. The shutter leading and trailing curtains C, D are tripped with a time difference to form a slit, thereby exposing the film surface F.

The symbol H also denotes a flash waveform for a duration of the high-speed repetitive flash.

The following is a detailed explanation of the operations of the camera Y and the electronic flash apparatus X when the mode setting circuit 11 sets the high-speed flash mode in the above-mentioned electronic flash apparatus of the camera. 10 To start with, when the power switch 2 is closed, the boost control circuit 4 outputs the actuation signal to the boost circuit 3 on the basis of the signal outputted via the signal line a from the main control circuit 10. The boost circuit 3 thereby starts a known boosting action, and the main capacitor 5 stores the electric charge.

The voltage detection circuit 6 monitors the voltage of the main capacitor 5, and the voltage information is inputted via the signal line b to the main control circuit 10.

Based on the inputted voltage information, the main control circuit 10 outputs an energizing signal to the ready light 12 and thereby energizes the ready light 12 just when the voltage of the main capacitor 5 reaches a preset voltage.

Note that the mode setting circuit 11 herein sets the high-speed repetitive flash mode, and hence the ready light 12 is energized when a voltage of the comparator 32 becomes the second energizing voltage.

Further, the main control circuit 10 outputs the energizing signal also to a signal line i and thereby energizes a ready light 29 through the camera interface 20.

When a release switch 28 of the camera Y is closed in this energized state, a release signal is inputted via a signal line t to the MCU 23. Furthermore, the 10 release signal is transmitted via a signal line s to a shutter curtain control circuit 24. The shutter curtain control circuit 24 switches off a leading curtain magnet 25. Tripping of the shutter leading curtain C is started at a timing $t_o$ in FIG. 4.

Incidentally, it is herein assumed that a shutter speed of the camera Y is set $t_o$ a slit flashsync value, e.g., 1/4000 sec.

Thereafter, a leading curtain trip detection switch 26 is closed at a timing $t_1$ in FIG. 4. A flash starting signal is transmitted to the main control circuit 10 via a signal line u, the shutter curtain control circuit 24, the signal line s, the MCU 23, a signal line q, the camera interface 20 and a signal line h.

The main control circuit 10 thereby outputs the flash starting signal via the signal lines c, d, with the result that the trigger circuit 8 and the flash quantity control circuit 9 are actuated. The flashtube 7 starts the high-speed repetitive flash at the timing $t_1$, whereby the exposure of the film surface F is started.

On the other hand, the tripping of the shutter trailing curtain D is started because of the shutter curtain control circuit 24 switching off a trailing curtain magnet 27 at a timing $t_2$. The shutter trailing curtain D starts shielding the film surface F at a timing $t_3$.

Accordingly, a shutter time is a time period between the timing $t_1$ and the timing $t_3$.

The shutter trailing curtain D further continues to be tripped to completely shield the film surface F at a timing $t_5$.

The camera Y transmits, when the shutter curtain control circuit 24 detects this timing, the detection information via the signal line s to the MCU 23. The MCU 23 transmits a flash stop signal of the electronic flash to the camera interface 20 via a signal line q.

The camera interface 20 outputs the flash stop signal via the signal line j. In the electronic flash apparatus X, the main control circuit 10 receives this flash stop signal, thereby outputting the flash stop signal through the signal line e.

The flash quantity control circuit 9 stops the flash of the flashtube 7 in response to this flash stop signal, thus ending the high-speed repetitive flash.

In the thus constructed electronic flash apparatus of the camera, when the mode setting circuit 11 defined as the setting means sets the single flash mode, the main control circuit 10 energizes the ready light 12 with the predetermined first energizing voltage. While on the other hand, when the mode setting circuit 11 as the setting means sets the high-speed repetitive flash mode, the ready light 12 is energized with the second 10 energizing voltage higher than the predetermined first energizing voltage. It is therefore possible to surely effect the single and high-speed repetitive flash during the energizing of the ready light 12.

More specifically, according to this electronic flash apparatus of the camera, in the high-speed repetitive flash, the ready light 12 is energized just when the voltage of the main capacitor 5 reaches the second energizing voltage well higher than the first energizing voltage set for the single flash. Therefore, while the ready light 12 is energized, the voltage of the main capacitor 5 is always at a level enough to surely perform the high-speed repetitive flash. It does not happen that the flash is terminated at a timing $t_6$ in FIG. 6 as done in the prior art but continues surely up to the timing $t_5$. Consequently, a photo with no vignetted portion K can be certainly obtained even in the photography with the high-speed repetitive flash.

As discussed above, in the electronic flash apparatus of the camera according to this invention, when the single flash mode is set by the setting means, the ready light is energized with the predetermined first energizing voltage. While on the other hand, when the high-speed repetitive flash mode is set by the setting means, the ready light 12 is energized with the second energizing voltage higher than the predetermined 10 first energizing voltage. The advantage is therefore such that the single flash and the high-speed repetitive flash can certainly take place during the energizing of the ready light.

Next, another embodiment of the present invention will be discussed with reference to FIG. 6 and some other Figures. Note that this embodiment is a version where the circuit shown in FIG. 1 is basically utilized. In accordance with this embodiment, however, the leading curtain trip detection switch 26 is so constructed as to be closed at a timing $t_1$ slightly earlier than the timing $t_2$ in FIG. 7.

Figure 6:
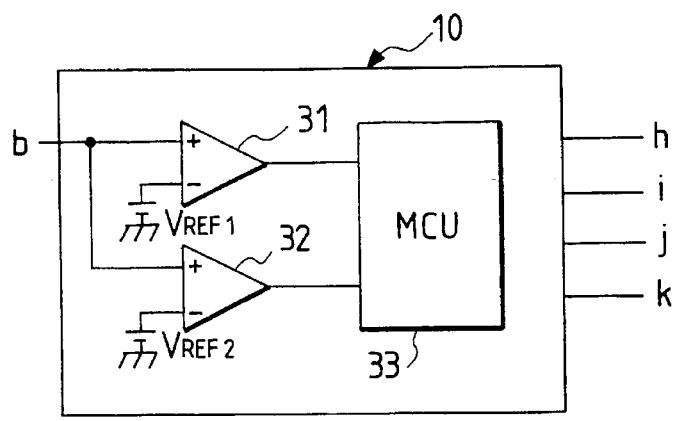
FIG. 6 is a circuit diagram fully showing the main control circuit of FIG. 1 in another embodiment.

FIG. 6 fully illustrates the main control circuit 10 of the electronic flash apparatus X of FIG. 1. In this embodiment, the voltage information of the main capacitor 5 from the voltage detection circuit 6 is inputted via the signal line b to the internal comparators 31, 32 of the main control circuit 10.

The comparator 31 detects an energizing voltage for the ready light 12. The comparator 32 detects a boost stop voltage.

Note that the symbols $V_{REF1}$, $V_{REF2}$, represent reference voltages of the detected voltages.

Figure 7:
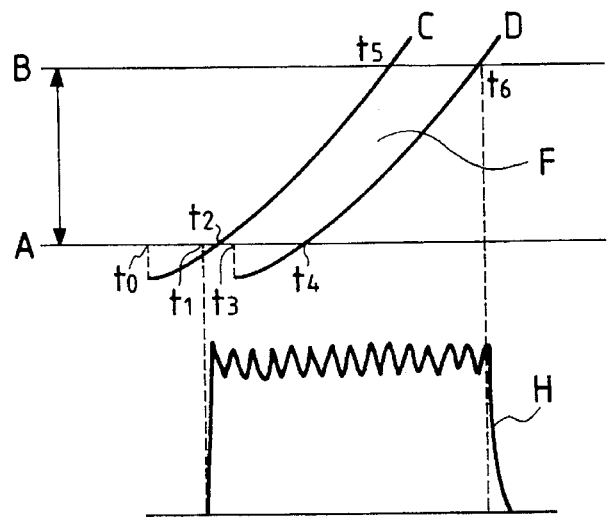
FIG. 7 is an explanatory diagram showing a relationship of a high-speed repetitive flash waveform versus of a shutter action at the slit flashsync in the electronic flash apparatus of FIG. 1 in another embodiment.
Figure 8:
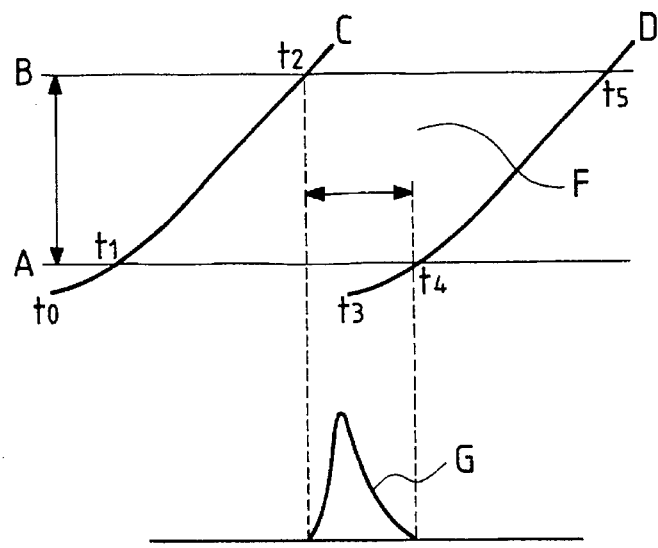
FIG. 8 is an explanatory diagram showing a relationship of a flash waveform versus a shutter motion for a duration of the signal flash.
Figure 9:
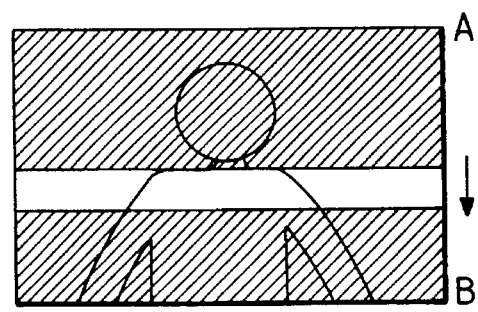
FIG. 9 is an explanatory view showing an exposed state at the slit flashsync.
Figure 10:
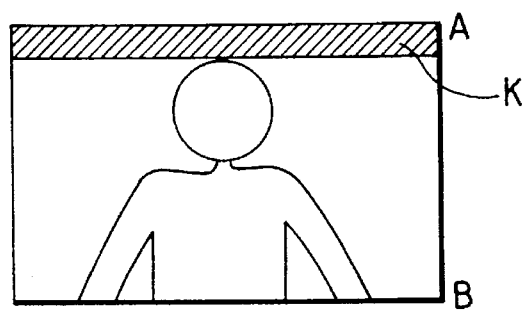
FIG. 10 is an explanatory view illustrating a vignetted portion at the slit flashsync.

Further, an MCU 33 controls the operation of the electronic flash apparatus X on the basis of output information from the comparators 31, 32 and other information as well. FIG. 7 shows flash timings of the flashtube 7 versus actions of shutter curtains of a focal plane shutter. Referring to the same FIG., the symbols A, B designate one edge and the other edge of the film surface F. An interval between the one edge A and the other edge B in, e.g., the vertical-trip focal plane shutter is 24 mm.

The symbol C represents the shutter leading curtain, while D is the shutter trailing curtain. The shutter leading and trailing curtains C, D are tripped with a time difference to form a slit, thereby exposing the film surface F.

The symbol H also denotes a flash waveform in the high-speed repetitive flash.

In the camera system described above, when the power switch 2 is closed, the boost control circuit 4 outputs the actuation signal to the boost circuit 3 on the basis of the signal outputted via the signal line a from the main control circuit 10. The boost circuit 3 thereby starts a known boosting action, and the main capacitor 5 stores the electric charge.

The voltage detection circuit 6 monitors the voltage of the main capacitor 5, and the voltage information is inputted via the signal line b to the main control circuit 10.

Based on the inputted voltage information, the main control circuit 10 outputs an energizing signal to the ready light 12 and thereby energizes the ready light 12 just when the voltage of the main capacitor 5 reaches a preset voltage.

Further, the main control circuit 10 outputs the energizing signal also to the signal line i and thereby energizes the ready light 29 through the camera interface 20.

When a release switch 28 of the camera Y is closed in this energized state, a release signal is inputted via the signal line t to the MCU 23. Furthermore, the release signal is transmitted via the signal line s to the shutter curtain control circuit 24. The shutter curtain control circuit 24 switches off the leading curtain magnet 25. Tripping of the shutter leading curtain C is started at a timing $t_0$ in FIG. 7.

Incidentally, it is herein assumed that a shutter speed of the camera Y is set to, a slit flashsync value, e.g., 1/4000 sec.

Then, the leading curtain trip detection switch 26 is closed at a timing $t_1$ slightly earlier than the timing $t_2$ in FIG. 7. A flash starting signal is transmitted to the main control circuit 10 via the signal line u, the shutter curtain control circuit 24, the signal line s, the MCU 23, the signal line q, the camera interface 20 and the signal line h.

The main control circuit 10 thereby outputs the flash starting signal via the signal lines c, d, with 10 the result that the trigger circuit 8 and the flash quantity control circuit 9 are actuated. The flashtube 7 starts the high-speed repetitive flash at the timing $t_1$.

Thereafter, the shutter leading curtain C exceeds a point (traverse point over A in FIG. 7) of the timing $t_2$ in FIG. 7, thereby starting the exposure of the film surface F.

Then, at this start edge of an exposure frame on time, the flashtube 7 starts the high-speed repetitive flash at the timing $t_1$, and, therefore, a flash intensity of the flashtube 7 becomes substantially uniform.

On the other hand, the tripping of the shutter trailing curtain D is started because of the shutter curtain control circuit 24 switching off the trailing curtain magnet 27 at a timing $t_2$. The shutter trailing curtain D starts shielding the film surface F at a timing $t_4$.

Accordingly, a shutter time is a time period between the timing $t_2$ and the timing $t_4$.

The shutter trailing curtain D further continues to be tripped to completely shield the film surface F at a timing $t_6$.

The camera Y transmits, when the shutter curtain control circuit 24 detects this timing, the detection information via the signal line s to the MCU 23. The MCU 23 transmits a flash stop signal of the electronic flash to the camera interface 20 via the signal line q.

The camera interface 20 outputs the flash stop signal via the signal line J. In the electronic flash apparatus X, the main control circuit 10 receives this flash stop signal, thereby outputting the flash stop signal through the signal line e.

The flash quantity control circuit 9 stops the flash of the flashtube 7 in response to this flash stop signal, thus ending the high-speed repetitive flash.

In the thus constructed camera system, when starting the exposure of the film surface F, the flash by the flashtube 7 becomes substantially uniform. It is therefore possible to absolutely obviate the possibility wherein the start edge of an exposure frame on the film surface F may not be exposed at the slit flashsync for a duration of the high-speed repetitive flash.

Namely, according to this camera system, the leading curtain trip detection switch 26 defined as the signal output means is closed at the timing $t_1$ slightly earlier than the timing $t_2$ in FIG. 7, i.e., earlier by a predetermined time than when the slit aperture of the focal plane shutter reaches a photographing picture of the film. The flash starting signal is transmitted to the main control circuit 10 serving as the control means. The flashtube 7 starts the high-speed repetitive flash at the timing $t_1$. Therefore, when the shutter leading curtain C exceeds the point (the traverse point over A in FIG. 7) of the timing $t_2$ in FIG. 7 to start the exposure of the film surface F, the flash intensity of the flashtube 7 becomes substantially uniform. It is feasible to absolutely obviate the possibility in which the start edge of an exposure frame on the film surface F may not be exposed at the slit flashsync for the duration of the high-speed repetitive flash.

Hence, the photo with no vignetted portion K can be surely obtained even in the photography with the slit flashsync.

As discussed above, in the camera system of this invention, the flash tube starts the high-speed repetitive flash earlier by the predetermined time than when the slit aperture of the focal plane shutter reaches the photographing picture of the film. Hence, when the starting the exposure of the film surface F, the flash by the flashtube becomes substantially uniform. This produces the advantage of being capable of absolutely obviating the possibility that the start edge of an exposure frame on the film surface F may not be exposed at the slit flashsync for the duration of the high-speed repetitive flash.

It is apparent that, in this invention, a wide range of different working modes can be formed based on the invention without deviating from the spirit and scope of the invention. This invention is not restricted by its specific working modes except being limited by the appended claims.

What is claimed is:

1. An electronic flash apparatus of a camera incorporating a focal plane shutter, comprising:

a capacitor for storing an electric charge;

a flashtube for irradiating a subject with a flash of light by the electric charge stored in said capacitor;

a setting means capable of setting any of a single flash mode in which said flashtube effects a single flash and a high-speed mode in which said flashtube effects high-speed repetitive flash;

a voltage setting means for setting a first voltage as an energizing voltage when said single flash mode is set and setting a second voltage higher than said first voltage as an energizing voltage when said high-speed mode is set; and an energizing means for monitoring a voltage when the electric charge is stored in said capacitor and energizing a ready light just when the voltage in the storage of the electric charge exceeds the set energizing voltage.

2. The electronic flash apparatus of the camera according to claim 1, wherein said second voltage is a voltage obtained when said capacitor stores the electric charge having a quantity enough for said flashtube to perform the high-speed repetitive flash during a shutter open time period.

3. The electronic flash apparatus of the camera according to claim 1, wherein said focal plane shutter of said camera includes a shutter leading curtain and a shutter trailing curtain which form a slit on a photographing picture in a high-speed shutter time of second, and a film is exposed through said slit.

4. A method of controlling an electronic flash apparatus comprising the steps of:

emitting light from a flashtube by discharging electric charge accumulated in a capacitor, to irradiate an object;

setting either one of a single emission mode in which the flashtube emits light once, and a repeat emission mode in which the flashtube repeatedly emits light at high cycle;

setting a first voltage as an energizing voltage when the single emission mode is set, and setting as the energizing voltage, a second voltage which is higher than a first voltage when the repeat emission mode is set; and monitoring a voltage of said capacitor when the charge is accumulating, and energizing a ready light when the monitored voltage exceeds the energizing voltage.

5. A method according to claim 4, wherein the second voltage is obtained when an amount of electric charge accumulated in said capacitor is sufficient to ensure that said flashtube can repeatedly emit light at high cycle during a shutter open time.

6. A method according to claim 4, wherein said electric flash apparatus is attachable to a camera having a focal plane shutter with a leading curtain and a trailing curtain, between which a slit is formed on an image plane at a high-speed shutter time, a film being exposed through said slit.

7. An electronic flash apparatus of a camera incorporating a focal plane shutter, comprising:

a capacitor which stores an electronic charge;

a flashtube which irradiates a subject with a flash of light by the electric charge stored in said capacitor;

a setting device capable of setting any of a single flash mode in which said flashtube effects a single flash and a high-speed mode in which said flashtube effects high-speed repetitive flash;

a voltage setting device which sets a first voltage as an energizing voltage when said single flash mode is set and sets a second voltage higher than said first voltage as an energizing voltage when said high-speed mode is set; and an energizing device which monitors a voltage when the electric charge is stored in said capacitor and energizes a ready light just when the voltage in the storage of the electric charge exceeds the set energizing voltage.

8. An electronic flash apparatus of a camera, comprising:

a capacitor which stores an electric charge;

a flashtube which irradiates a subject with a flash of light by the electric charge stored in said capacitor;

a setting device capable of setting any of a single flash mode in which said flashtube effects a single flash and a repetition mode in which said flashtube effects repetitive flash;

a voltage setting device which sets a first voltage as an energizing voltage when said single flash mode is set and sets a second voltage higher than said first voltage as an energizing voltage when said repetition mode is set; and an energizing device which monitors a voltage when the electric charge is stored in said capacitor and energizes a ready light just when the voltage in the storage of the electric charge exceeds the set energizing voltage.

* * * * *